United States Patent [19]
Willoughby, Jr. et al.

[11] Patent Number: 5,293,687
[45] Date of Patent: Mar. 15, 1994

[54] WHEEL MANUFACTURING METHOD

[75] Inventors: Louis G. Willoughby, Jr., Bay Village; Donald G. Jordan, Willoughby, both of Ohio

[73] Assignee: Aluminum Company of America, Pittsburgh, Pa.

[21] Appl. No.: 27,616

[22] Filed: Mar. 5, 1993

Related U.S. Application Data

[63] Continuation-in-part of Ser. No. 698,754, May 10, 1991, abandoned.

[51] Int. Cl.$^5$ .................. B21K 1/28; G01B 11/06
[52] U.S. Cl. .................. 29/894.35; 356/381; 356/394
[58] Field of Search .......... 29/894, 894.35; 356/376, 381, 384, 386, 394

[56] References Cited

U.S. PATENT DOCUMENTS

| | | | |
|---|---|---|---|
| 4,111,557 | 9/1978 | Rottenkolber et al. | 356/394 |
| 4,188,544 | 2/1980 | Chasson | 356/376 |
| 4,201,476 | 5/1980 | Musto et al. | 356/386 |
| 4,204,434 | 5/1980 | Whitsel | 73/622 |
| 4,432,648 | 2/1984 | Musto et al. | 356/387 |
| 4,449,226 | 5/1984 | Collmann | 378/58 |
| 4,476,533 | 10/1984 | Daudt et al. | 364/473 |
| 4,576,482 | 3/1986 | Pryor | 356/376 |
| 4,674,869 | 6/1987 | Pryor et al. | 356/1 |
| 4,679,447 | 7/1987 | Sieradzki et al. | 73/865.8 |
| 4,695,163 | 9/1987 | Schachar | 356/369 |
| 4,798,469 | 1/1989 | Burke | 356/376 |
| 4,798,964 | 1/1989 | Schmalfuss et al. | 250/560 |
| 4,803,645 | 2/1989 | Ohtomo et al. | 364/560 |
| 4,806,777 | 2/1989 | Ulbers et al. | 250/560 |
| 4,872,757 | 10/1989 | Cormack et al. | 356/376 |
| 4,894,551 | 1/1990 | Kishimoto et al. | 356/376 |
| 4,929,843 | 5/1990 | Chmielewski, Jr. et al. | 250/561 |
| 4,937,445 | 6/1990 | Leong et al. | 250/237 |
| 4,964,770 | 10/1990 | Steinbichler et al. | 433/223 |
| 4,982,103 | 1/1991 | Meiffreu et al. | 250/560 |
| 4,982,438 | 1/1991 | Usami et al. | 382/25 |
| 4,989,984 | 2/1991 | Salinger | 356/445 |
| 4,993,836 | 2/1991 | Furuhashi et al. | 356/376 |
| 5,003,187 | 3/1991 | Zumbrunn et al. | 250/560 |

FOREIGN PATENT DOCUMENTS

12308  1/1982  Japan .................. 356/381

*Primary Examiner*—P. W. Echols
*Attorney, Agent, or Firm*—Gary P. Topolosky

[57] ABSTRACT

There is disclosed an improved method for manufacturing wheels in a production line by: hot-shaping metal into wheel-shaped articles which are larger in some areas than the wheels to be formed and which have a plurality of complexly-curved inner and outer surfaces; cooling the wheel-shaped articles and removing excess metal from some areas of the wheel-shaped articles. The improvement comprises: inspecting at least some of the wheel-shaped articles at a plurality of points along a transverse plane through the inner and outer surfaces of each article being inspected and at a plurality of transverse plane locations about the perimeter of each such article with a contactless gauging system recently after the articles have been hot-shaped to determine whether the articles are within dimensional requirements to form a wheel therefrom. The improvement further comprises taking corrective action to the hot-shaping operation to minimize the number of unacceptable wheel-shaped articles that are being formed after finding an article which is not within dimensional requirements.

6 Claims, 5 Drawing Sheets

WHEEL MANUFACTURING METHOD

This application is a continuation-in-part of application Ser. No. 07/698,754, filed May 10, 1991 now abandoned.

BACKGROUND OF THE INVENTION

1. Field of the Invention

This invention relates to field of visual or non-contact inspection systems and methods. In this field, objects or parts of an object are visually scanned to produce profile images. The invention particularly relates to a system and method for gauging the thickness of a light-reflective, contoured object, such as a vehicle wheel, without destroying the object being gauged and without physically contacting said object in order to take any measurement readings thereof. The system and method of this invention may be used to gauge the thickness of a hot vehicle wheel, such as one recently removed from a forging press or tempering oven. The invention is designed for on-line inspection of various intermediates within the wheel manufacturing process but may also be positioned apart from the wheel manufacturing area. In any event, this system reduces scrap levels, eliminates the waste associated with processing pre-machined wheels which do not meet dimensional specifications and improves the ability to monitor manufacturing equipment for defects.

2. Technology Review

The field of contactless measuring has grown by leaps and bounds in recent years. Because of the accuracy and speed that various systems provide, contactless measuring methods are finding their way into more and more product manufacturing operations and/or post-manufacturing inspection stations.

In U.S. Pat. No. 4,674,869, there is claimed a method and apparatus for determining the contour of a varying contoured object surface. The method and apparatus employ optical triangulation-based coordinate measurement machines and robotic guidance of its light sensors to accurately measure such complex shapes as the teeth of a gear, or turbine blades.

U.S. Pat. No. 4,695,163 shows a method and apparatus for determining surface shapes using reflected laser light. This system incrementally moves a laser light source in a rectilinear path along a track, and pivotal about the track. Light reflected from the object's surface is maximally polarized when its angle of incidence equals Brewster's Angle. Information about the position of the light source is then fed to a computer which reconstructs the shape of the surface being scanned by plotting a two-dimensional view of the spatial points detected by this system's sensing means.

The non-contact gauging system set forth in U.S Pat. No. 4,798,469 employs a cone of light as its optical means to determine the relative locations of various features of an object, such as its size and shape. The system utilizes both incident and reflected light from a disc-like spot illuminated on the surface of the object being gauged. Preferred embodiments of this system include multiple gauge heads, all operated through a single microcomputer.

In U.S. Pat. No. 4,803,645, there is claimed a method and apparatus for measuring the coordinates of an object viewed from at least three different directions. The method of measuring object coordinates with this apparatus requires deriving correlations between the observed coordinates and those from a measured reference point.

U.S. Pat. No. 4,679,447 shows a method and apparatus for gauging railroad wheels for warping, rotundity and tape size. Although this apparatus may employ a plurality of lasers and receivers, the second and third lasers combine to measure the wheel's outside diameter at successive angular cross-sections and not across any sort of thickness plane through the wheel.

The method and apparatus for measuring the tread quality of a railroad wheel from U.S. Pat. No. 4,798,964 illuminates the wheel's circumference while the wheel remains on a railroad car passing over a particular measuring area of railroad track. The lasers and camera sensors of this system produce analog signals representing the wheel's quality of tread or profile. Such information is then digitized and supplied to a central processing unit for determining whether said wheel should be subjected to an automatic wheel truing operation.

Prior to the present invention, vehicle wheels had to be cooled to the point where they were safe to contact for manually measuring various cross-sectional thicknesses with known and other elaborate caliper gauging devices. Such devices often had to be adapted for taking readings of the wheel's contours, while themselves fitting over and about the wheel's various inner and outer surface contours. In some cases, precision of the measurements taken were sacrificed in order to obtain approximate thickness readings of certain wheel regions. Much time was lost waiting for the forged wheel blank to cool, then wrestling with taking multiple measurements thereof. During this time, literally hundreds of wheels would be forged with the same undetected processing error being passed on to each successive wheel. The wheel inspection system of this invention makes such prior measuring practices seem almost prehistoric by comparison.

SUMMARY OF THE INVENTION

It is a principal objective of the present invention to provide a system and method for visually inspecting a generally cylindrical object, such as a vehicle wheel, having a plurality of inner and outer curved surfaces. It is another objective to provide a wheel inspection system which measures the thickness of a wheel along several critical points of the wheel's inner and outer contours in order to determine whether the wheel is within dimensional specification. It is another main objective to provide a system and method for measuring the three-dimensional thickness of an object having complexly curved inner surfaces which would not otherwise be reachable with standard, manual measuring devices, or with the light source and sensor arrangements of the prior art visual inspection systems summarized above.

It is another principal objective to provide a system and method for gauging wheels which may be incorporated into the overall wheel production process, i.e., without regard to temperature of the wheel being gauged. More specifically, it is an objective of this invention to provide a real-time wheel measuring system which can inspect a recently forged, wheel while the wheel is still hot from the forging press. It is another main objective to provide a wheel inspection system which may be used to inspect every wheel promptly after it is forged, machined and/or tempered. In this manner, the wheel inspection system of the present invention can be used to detect defects in the most recently forged product, and forging press or die problems, before the defect or equipment problem proliferates to produce hundreds of out-of-specification wheels which will then have to be scrapped, remelted and reforged.

In accordance with the foregoing objectives and advantages, there is provided a system for visually measuring the cross-sectional thickness of a light-reflective object, such as a vehicle wheel, said object having a plurality of curved surfaces. The system includes: means for transmitting a line of light onto each curved surface of the object at substantially the same cross-sectional area through the object; means for sensing the lines of light reflected from each curved surface and producing a plurality of signals thereby, said signals representing a linear profile of each curved surface at the same cross-sectional area or along a transverse plane through said curved surfaces; and means for comparing the profile signals from each curved surface for calculating a cross-sectional thickness of the object at one or more points along the same cross-sectional area. On a more preferred basis, this system further includes means for supporting the object, and means for rotating the object about at least one axis of support to measure a plurality of cross-sectional thicknesses thereof or measuring such cross-sectional thicknesses at a plurality of transverse plane locations about the perimeter of said object. Most preferably, the light transmittal means of this system include a plurality of light sources for transmitting collimated laser lines across the object's inner curved surfaces from opposite sides of the object substantially simultaneously. A method for inspecting a vehicle wheel to determine whether it is within dimensional specification is also disclosed. This method employs a system substantially as set forth above.

BRIEF DESCRIPTION OF THE DRAWINGS

Further features, objectives and advantages of the present invention will be made clearer from the following detailed description of the preferred embodiments made with reference to the drawings in which.

DETAILED DESCRIPTION OF THE PREFERRED EMBODIMENTS

The present invention is directed to a system and method for visually measuring or gauging, in a nondestructive manner, the cross-sectional thickness of a vehicle wheel such as a truck wheel, automotive wheel or aircraft wheel made from a light-reflective material such as steel, aluminum or the like. It is to be understood, however, that this system's methods for illuminating and sensing curved surface illuminations may be applied to measure the cross-sectional thicknesses of most any object having a plurality of inner and outer contours, especially cylindrically-shaped objects or the like.

The system of this invention is designed as an on-line production means for measuring the specific radial cross-section dimensions and critical tolerances of each potential wheel as it exits the forging press. By "potential wheel", it is meant that the wheel is still in an intermediate stage of processing and that further operations, such as machining, aging or the like, have to be conducted on the wheel intermediate before it is in condition for sale or customer end-use. The system is also designed to gauge the thickness of a vehicle wheel, regardless of its wheel surface temperature, to determine whether said wheel is suitable for further processing, especially by machining and post-forming aging or tempering. In a like manner, the system can be adapted for inspecting vehicle wheels after any successive processing steps. The system was also designed to store measurements and data from a plurality of wheel inspections, on hard disk storage and on floppy disks, for use in comparative, statistical analyses, long-term trend detection studies, graphical display purposes, printing, and transfer to other computer storage and software systems.

The system takes measurements from a plurality of data points acquired from the wheel's inner and outer profiles (or contours) as the wheel is being indexed (or rotated and periodically stopped) for inspection at a plurality of positions. These inside and outside profiles are mathematically combined to provide an accurate cross-sectional measurement of the wheel rim in a plane containing the idealized surface normals of the wheel, i.e., the plane perpendicular to the rim surface and through the axial center of the wheel itself. The system is designed to employ multiple cameras, lasers, optics, filters, and lighting fixtures to maximize the capabilities of its computer vision subsystem to achieve the highest possible resolution and accuracy given the mechanical constraints of material handling, equipment assembly and operating costs, and fixture positioning. The present invention calculates cross-sectional wheel thicknesses to within an accuracy of well below ±0.05 inch. Preferred embodiments actually approximate cross-sectional thicknesses to within about ±0.01 or less.

Referring now to FIGS. 1A through 2B, there is shown a wheel inspection system or unit, generally 10, preferably arranged as part of an on-line wheel manufacturing process. The other manufacturing steps of this process are not fully depicted in FIG. 1A, but may include a jib crane J (as shown in partial silhouette), or other known or subsequently developed means for transporting forged wheels W from the forging press, machining stand, tempering oven or other wheel holding area, and onto the indexer portion of this system.

Figure 1A:
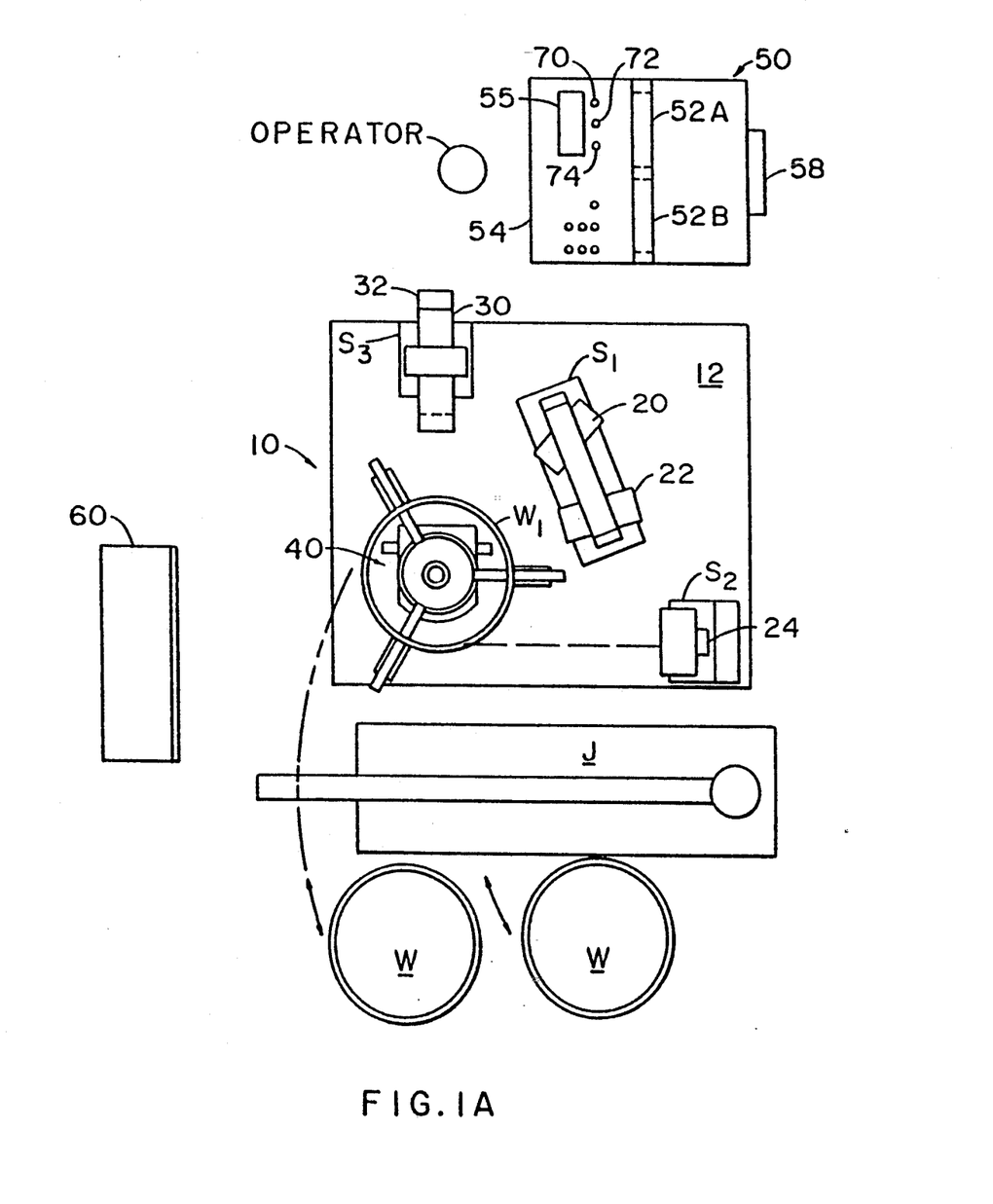
FIG. 1A is a top, plan view of one embodiment of the invention positioned as part of an on-line wheel forging operation and with the hydraulic and electrical connections deleted for better illustration.
Figure 1B:
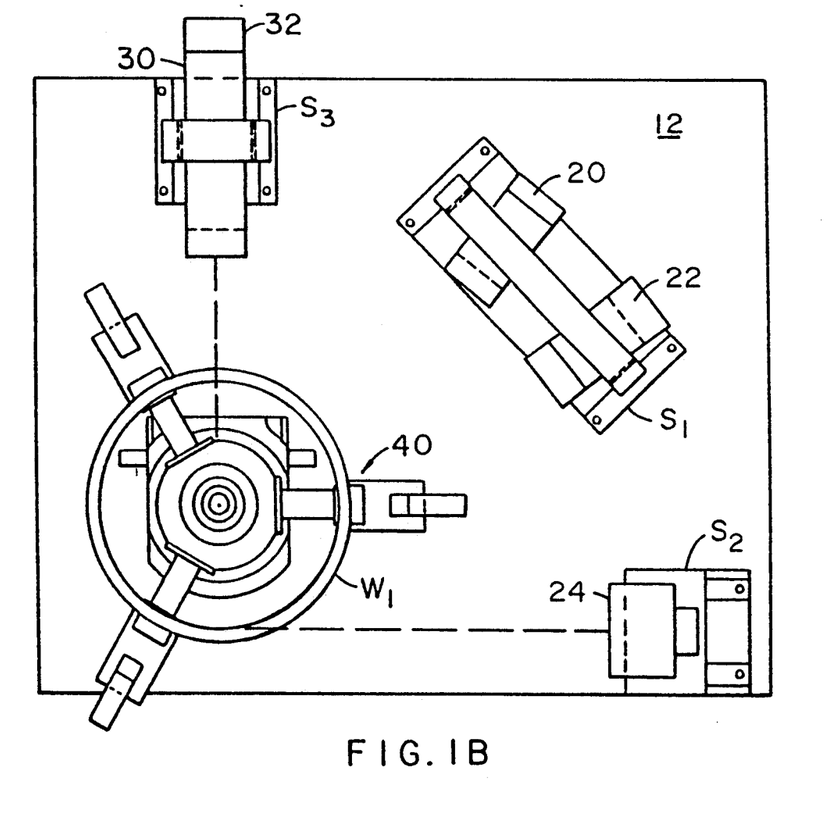
FIG. 1B is an exploded, plan view of the platform portion of the system shown in FIG. 1A.

A principle component of the present system is the platform base 12 upon which a majority of the system is fixedly mounted. The platform 12 rests on a plurality of vibration dampers 14 for absorbing most, if not all of the vibration resulting from the system's surrounding equipment. The system employs highly sensitive laser and light sensing (CCD camera) equipment. It is critical that this equipment remain steady, without substantial movement in any direction while it takes measurement readings from a wheel being inspected therewith. As such, it may be necessary to employ still more sophisticated vibration damping supports beneath platform 12 depending on the system's relative position to the wheel forging press and/or other on-line production equipment.

Figure 2A:
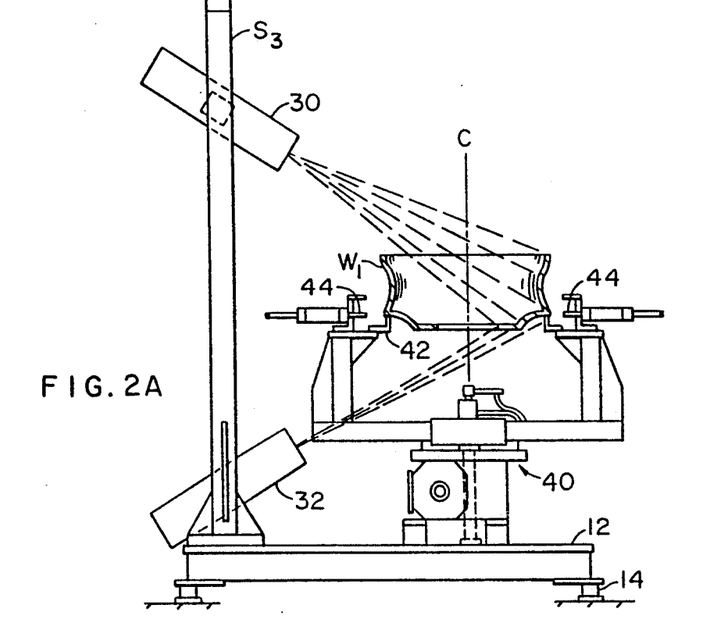
FIG. 2 is a side view of a first vehicle wheel positioned on the system's indexer with the laser stand of the base platform also being shown.
Figure 2B:
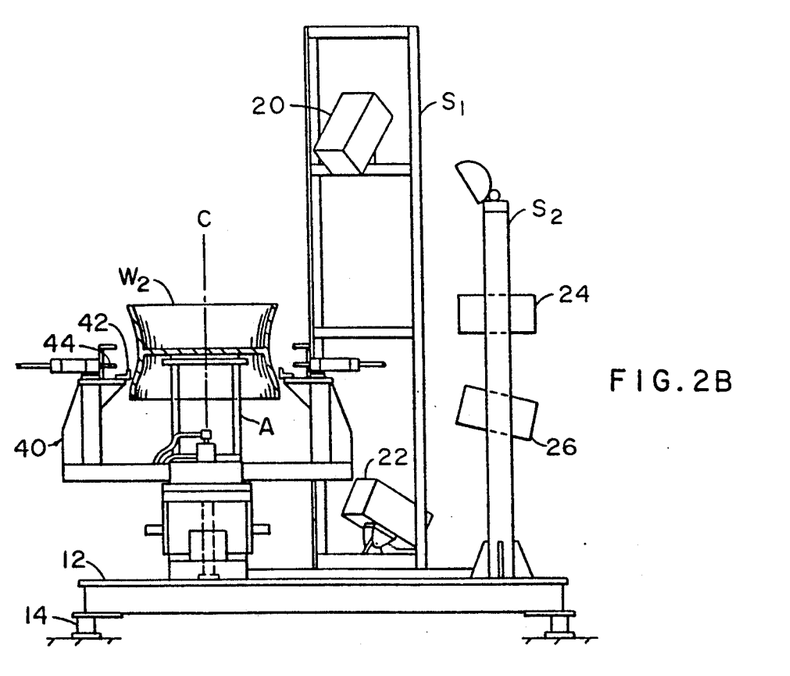
FIG. 2B is a side view of a second vehicle wheel positioned on the system's indexer with two camera stands of the base platform also being shown.

The inspection and gauging system of this invention employs a non-contact method of measuring to determine the surface of wheel rims, especially hot forged wheel rims, in three-dimensional object space. On a preferred basis, the light sensing means comprises two CCD (charge coupled device) cameras 20 and 22 mounted within environment protective enclosures above and below the system's wheel indexing mechanism (as best seen in FIG. 2B). A first camera support stand $S_1$ firmly holds these sensing means in place relative to platform 12. A third CCD camera 24 is fixedly mounted to the side of the wheel's indexer on its own, separate support stand $S_2$. For some vehicle wheel inspections such as that shown in FIG. 2B, it may be necessary to position a fourth CCD camera 26 on or about the same plane as camera 24 in order to obtain a full scanning of the wheel's outer profile. Two Helium-Neon lasers, 30 and 32, with line generators (not shown) are mounted above and below the wheel to produce vertical planes of laser light which intersect the top inside and bottom inside of the wheel perpendicular to the wheel's surface tangents. To insure substantially no movement of the lasers after calibration, they are fixedly mounted to stand $S_3$. The top and bottom cameras are mounted in such a way as to see past all mechanical fixtures and image the lines of light, in their respective fields of view, that appear on the inside wheel surfaces resulting from the lasers and optics. The angle of the top and bottom cameras relative to the wheel must be such that a continuous (but curved) line of light (intersection of the light plane with the contoured wheel surface) is observable in the image space of the cameras. This camera senses or records the outside profile of the wheel (as contrasted with the backlit table fixture) at the exact position tangent to the outside wheel surface and perpendicular to the planes of laser light.

The image acquisition and measurements of this system are keyed to the jog/indexing mechanism, generally 40, which rotates the wheel around its central axis of rotational symmetry C. Multiple measurements are made at the various positions of this indexer 40. The specific types of measurements and measurement locations are keyed to the type of wheel being produced. When indexer 40 has fixed the wheel at the next rotational stopping point, the computer vision system is triggered to proceed with image capture, image processing, image analysis, object measurement, and dimensional gauging operations. Resulting data is thus captured for immediate display to the operator 0 on the Inspection Computer Console, generally 50, in a visually comprehensible graphical format. This same data is also stored numerically for later analysis and interpretation. Out-of-control conditions and warnings are calculated based on measurements taken and these are flagged and highlighted graphically on the display screen. This process is repeated each time the indexer jogs the wheel $W_1$ to a new position.

For each wheel, a pass/fail determination is made based on dimensional criteria which has been established for each wheel type to be examined. On a preferred basis, this system inspects a wheel every 30 seconds (excluding material handling time). Such time should be sufficient to obtain data, process images, make measurements, and indicate results to the operator 0.

Figure 3A:
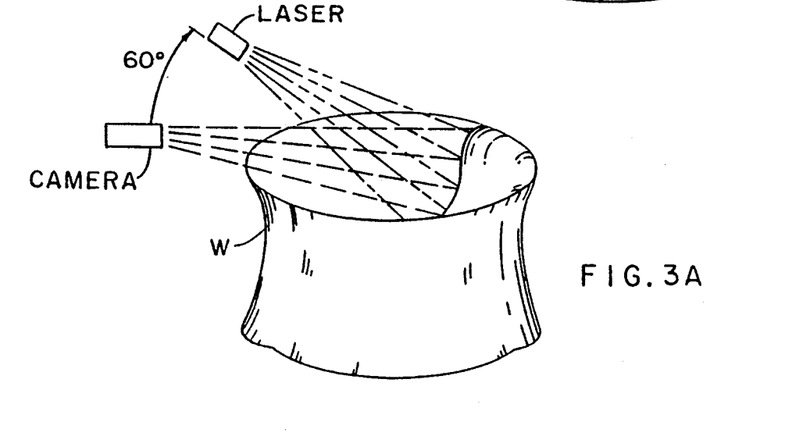
FIG. 3A is a schematic, perspective view showing the manner in which the system illuminates a wheel's inner profile.

FIG. 3A perspectively shows how the lasers and cameras of this invention illuminate and detect the wheel's inner profile. A reflecting laser-camera system must be used since no backlighting can reach the inner surface of wheel $W_1$ in any manner that allows the camera to see a specific surface, at least a portion of this surface, including all inner and outer curvatures thereof, in its entirety. The illumination and detection of the wheel's lower side is generally the same as that for the upper inner surface profile shown in FIG. 3A.

To measure the various outer profile dimensions, i.e., diameters, heights, etc., of wheel $W_1$, preferred embodiments of this vision inspection system employ a background lighting source 60 as shown in FIG. 1A. Although the backlight source 60 is shown as separately standing, it may also be incorporated onto platform 12 if spacing allows. In any event, wheel $W_1$ is preferably positioned between this backlight source 60 and camera 24 in order for the camera to see the light that is not stopped by the wheel, and generate a light/dark boundary indicating where the wheel's outer profile lies.

Figure 3B:
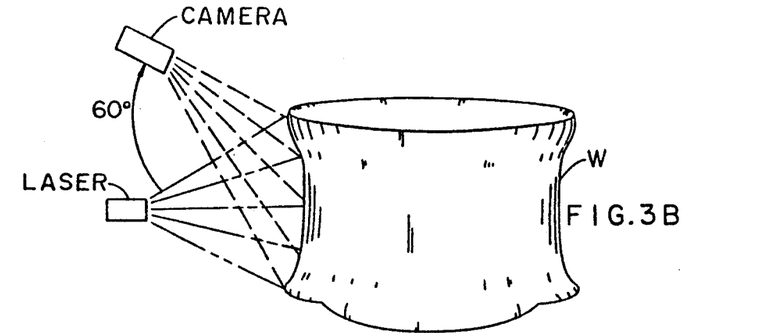
FIG. 3B is a schematic, perspective view showing one manner for illuminating a wheel's outer profile.

In an alternative embodiment, outer profile illumination may be accomplished via a separate colluminated laser (or third light source) as shown in FIG. 3B. If a laser is used to light the outer surface, camera 24 must be repositioned, picking up the reflection of this laser off the wheel's outer surface.

On a preferred basis, indexer 40 of the invention includes means for leveling the wheel $W_1$ on its fingerlike supports 42 and means for centering said wheel thereon. One embodiment of wheel centering means includes a trio of hydraulically controlled pins 44 for centrally positioning wheel $W_1$ on the indexer's supports until substantially equal levels of hydraulic back pressure are asserted on each pin 44. For some wheel shapes, such as wheel $W_2$ shown in FIG. 2B, it may not be possible to position the wheel on the three fingerlike supports of indexer 40. In those situations, an adapter A may be used to support the wheel $W_2$ from a centrally planar region beneath the wheel. Said adapter must not interfere, or only minimally interfere, with any of the camera and laser readings of the wheel's inner surface profile.

In the accompanying figures, the wheels inspected by this system are rested on the indexer's supports with the central axis C extending vertically therethrough (or normal to platform 12). It should be understood that a system for wheel inspection may also be assembled with an indexer whose wheel rotates with a horizontally-extending central axis with only minor modifications to the present system. The wheel would have to be held and rotated so that the wheel could be measured at various increments. An alternative embodiment moves the lasers and/or cameras about a fixedly mounted wheel. While this embodiment would be more expensive to operate, it is still feasible.

Figure 6:
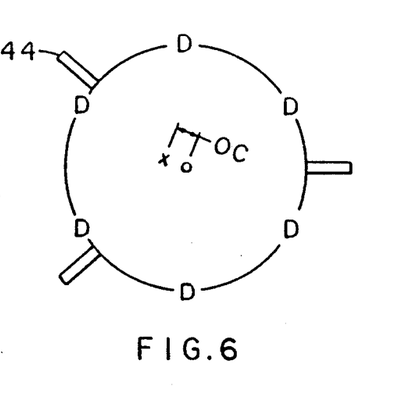
FIG. 6 is a schematic representation, in top view, of one means by which the invention compensates for off-center positioning of a wheel on the indexer of the system.

Once the cameras detect the wheel surfaces, positional information about the wheel is readily available. Obtaining thicknesses and relative distances (i.e., diameters) to a high degree of accuracy requires some specific mathematical processing, which was developed specifically for the system of this invention. Such processing includes defining the base plane of the wheel, and defining the axial center C of the wheel, as opposed to the rotating center of the chuck, which are close but not identical. The base plane of wheel is defined by the three supports 42 for holding up the wheel by its bottom surface. The wheel's axial center cannot be defined quite as easily, however. The hydraulic pins 44 used to center the wheel on supports 42 are not especially precise. Therefore, data must be taken as to the distance of the outside surface of the wheel from its axial center at a number of rotational positions. Once the center of these points is determined, the difference between the indexer's center and the center of the wheel's outside surface points is located and identified as the off-center compensation distance, or OC in FIG. 6. This location is critical to taking accurate measurements anywhere on the wheel. Once the degree of wheel off-centeredness relative to the indexer's center of rotation is known, adjustments can be made mathematically at each angle for the whole wheel profile, both inside and outside. Subtraction of an absolute distance from the wheel's center and the base plane yields a metal thickness value for the wheel at any given point along the radial cross-section.

Figure 5:
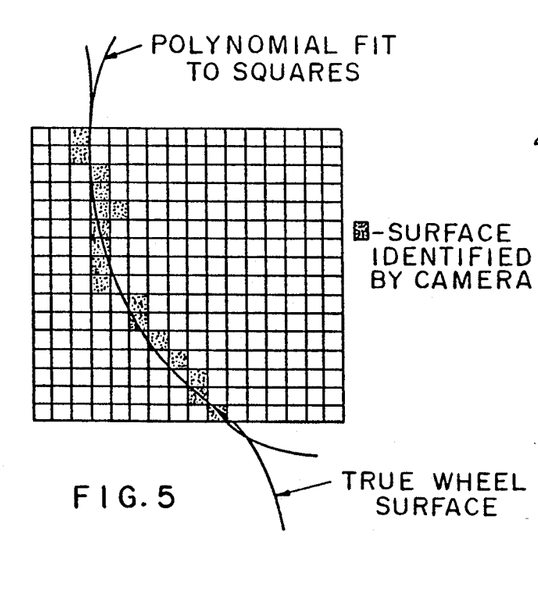
FIG. 5 is a schematic representation of one means by which the invention approximates true wheel surface profiles from the line of illuminated light reflected from wheel's actual profile, through the light sensing means and onto a a pixel matrix.

In some instances, polynomial fits are employed to smooth the data to fit a surface which is known to be physically nonlinear, as shown in FIG. 5. These polynomials calculate from the data received, wheel profile information along both the x- and y-axes of the camera pixel matrices employed herewith. The surface of the wheel cannot be well represented by the individual squares (pixels) of a camera's sensing means. When one fits a smooth curve through the points, the true wheel surface can be well approximated. This method increases accuracy, and enables the vision system to determine the metal thickness with much more accuracy than using individual pixels alone.

Figure 4A:
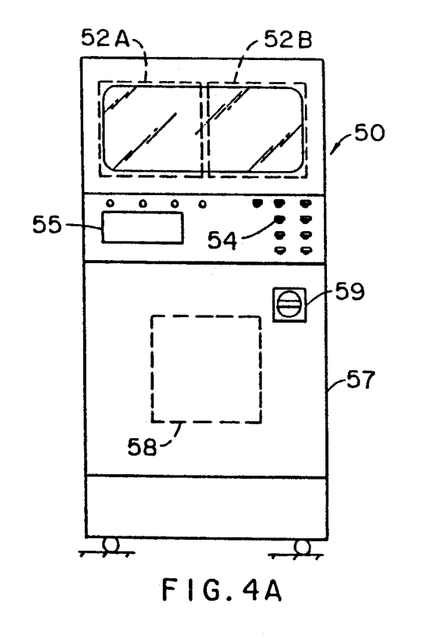
FIGS. 4A and 4B are and front and right side views of the system's inspection computer console.
Figure 4B:
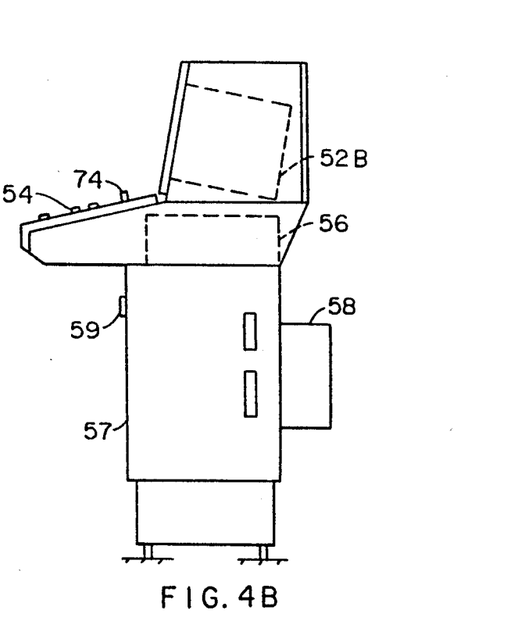
Figure 4C:
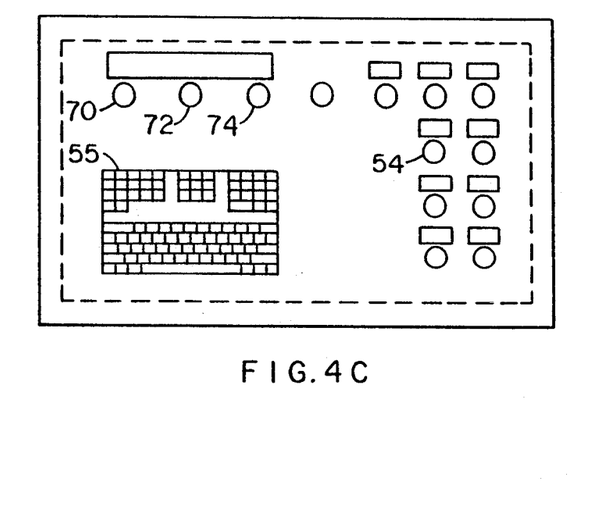
FIG. 4C is an exploded, top view of the control desk layout for the console shown in FIGS. 4A and 4B.

Referring now to FIGS. 4A through 4C, there is shown the operator interface to the system, or console 50 in greater detail. Console 50 includes two display monitors 52A and 52B, mounted side by side. There is also shown a panel of large color-coded panel 54 button-type switches, and a built-in full-function computer keyboard 55. The CPU 56 for this computer interface is housed within an environmentally protective structure 57 having a separate air conditioner 58 and master on-/off switch 59. On the display panel, numerous switches and lights, labeled for easy operation, lead the operator through a wheel inspection. Upon testing, the system's panel board illuminates a green light 70, amber light 72 or red light 74 to show whether the inspected wheel passes dimensional specifications 70, marginally meets the median data values 72, or fails 74.

The operator 0 of this system interacts with applications software through a menu of choices. The menus are hierarchically structured for simplicity and ease of use. Only those choices relevant to the task at hand are offered on the menu. The menus and instructions appear on the left display screen 52A which is a full color text/graphics monitor. This monitor is also used to view wheel profile graphics and data graphs and charts reflecting the results of gauging operations performed by the system. The live video images from the cameras and the captured and processed image data from the frame buffer are viewed in 8-bit grayscale format with color graphics overlays on the right side display screen. During the initial calibration process and inspection setup operations, the operator 0 is requested to interact with the video that appears on monitor 52A by using the arrow keys on keyboard 55 to position a box or a cursor over certain video elements and indicate measurement locations or sizes of windows indicating areas of interest. During these phases of operation, the left screen indicates what the operator is to do, while the right screen provides a visual guideline (with grayscale video images) and interactive feedback (using color graphics overlays for window boundaries, cursor locations, etc.).

Upon system start-up, a main menu allows the operator to choose from one of the following choices:
1) WHEEL INSPECTION
2) SYSTEM CALIBRATION
3) DATA ANALYSIS
4) EXIT SYSTEM Option 1 (WHEEL INSPECTION) will be used during production when wheels are being inspected. This is the primary functional module of the system that is expected to be in use most often.

Option 2 (SYSTEM CALIBRATION) is used infrequently to calibrate the entire vision system and establish a precise relationship between the two-dimensional camera image space and the three-dimensional real-world object space. Therefore, the system must be calibrated whenever there is a physical disturbance of any camera or laser element in the system. This calibration procedure may be required between production runs when switching dies from one wheel type to another. Calibration must certainly be performed after changing the field of view of any system camera. Accuracy of the measurements taken during performance of the inspection routines is greatly affected by the integrity of the calibration parameters obtained during the calibration procedure. Although fairly automatic, care should be taken during the calibration procedure to ensure accurate results.

Option 3 (DATA ANALYSIS) is the data management and analysis part of the system that allows an operator to examine specific datasets from measurements taken on wheels from any production run inspected by the system and to generate reports or graphs for display and/or printout. Data can be downloaded from hard disk to floppy disk and/or transferred to other computers for further statistical analysis or incorporation into other databases.

Option 4 (EXIT SYSTEM) ends execution of the software and returns the user to DOS.

The first part of the vision system calibration procedure involves setting the cameras and laser into correct physical position and orientation. The lasers must be mounted so that the plane of light emitted from the line generator optics is strictly vertical in a plane containing the axis of rotation of the wheel. The projected laser light must also extend from the tip of the rim all the way onto the mounting flange of the wheel. This is true for both the top and bottom lasers. Furthermore, the laser light projected from both lasers should be strictly coplanar so that the projected laser light on the top side of the mounting flange is directly opposite the projected laser light on the bottom side. Once the lasers are adjusted such that the above conditions are satisfied, they should be securely locked down into place so that they will not move.

The three or more cameras in the vision system must also be adjusted so that each camera's field of view contains the entire objective of its respective target. For maximum accuracy, the objectives of the cameras should fill their respective fields of view. Other than the above criterion, the exact position and orientation of the cameras need not be specified because the automated calibration software built into the system, together with a physical calibration standard will generate compensation factors for camera tilt or other orientation discrepancies.

The calibration procedure is begun by selecting the "system calibration" option from the main menu. During this phase, no wheel should be positioned on the index so that only a calibration standard, or array of black dots on one-inch centers is seen. After "system calibration" has been selected from the main menu, the system will present a submenu indicating a choice of which camera you would like to calibrate. All the cameras should be calibrated while the calibration standard is in place. It does not matter in what order the cameras are calibrated. Before proceeding, the operator should check all camera views with the calibration standard in place to ensure that there is an array of at least 100 calibration dots in a 10 by 10 dot array visible to all cameras. These dots which exist at known locations relative to the wheel indexing fixture will establish a relationship between the object space of the wheel and the image space of the camera. This relationship is expressed in the form of calibration parameters which are calculated by the system and stored on disk for reference.

After a particular camera choice is made for calibration, an additional submenu is presented that allows the operator to select between automatic and manual calibration modes. These two calibration modes are designed to accomplish the same objective. The "automatic" mode is easier and faster and much preferred. The "manual" mode takes longer and is more tedious but provides a backup should there be a problem with the "automatic" mode. A "thresholding" option is also presented on this submenu. The latter option allows fine tuning of the calibration process to account for environmental lighting conditions.

It is essential that the vision system of this invention be properly calibrated before any wheel is inspected and measured therewith. Once calibrated, the system will be ready to make accurate measurements and report these results to the operator in a variety of formats. The system is expected to be in its Inspection Mode most of the time.

Prior to actual inspection and measurement, it is necessary to prepare the system by providing specific information about the type of wheels to be produced and inspected therewith. This information tells the system what measurements to make on the wheels, where to make the measurements, and how many measurements to take. This information depends on what type of wheel is currently under production. For example, specialty truck wheels are different from conventional truck wheels and automotive wheels. It is therefore critical that the system be told which type of wheel it should expect so that it can make the appropriate measurements.

There are different kinds of measurement to be made at each indexer position of the wheel. At each position, the vision subsystem develops a complete cross-sectional profile of the wheel rim (both inside and outside). Measurements are then made using this rim cross-section data. Some of the measurements are designed to compare the forged wheel surface to a master wheel previously measured and stored. Other measurements are absolute distances (fixed location measurements) or thickness measurements on the forged wheel rim cross section.

It is important that the environmental lighting conditions are properly adjusted so that the vision system and its components can adequately inspect the wheels. In addition, all vision system components such as cameras that have adjustable features must be set according to the environmental lighting conditions. This must be accomplished before inspection or calibration can take place.

Measurement data for all wheels inspected by the system is automatically stored to disk during the inspection process. This data is stored in standard ASCII text files which can be exported to other software packages such as word processors or statistical analysis products. Data may be retrieved from the disk by specifying which wheel or wheels are of interest. From time to time, data should be backed up from the disk to floppy diskettes for safekeeping and to create storage space on the disk for new measurement data. Data stored on floppy diskettes may be copied back to the disk and subsequently retrieved for analysis or transferred to another computer for postprocessing, statistical analysis, or incorporation into reports, documentation, and other databases. Hardcopy output of displayed graphs can be obtained by selecting the print option. Printouts of numerical data can also be obtained by sending datafiles to the printer.

Having described the presently preferred embodiments, it is to be understood that the invention may be otherwise embodied by the scope of the claims appended hereto.

What is claimed is:

1. In a method for manufacturing wheels in a production line by hot-shaping metal into wheel-shaped articles which are larger in some areas than the wheels to be formed and which have a plurality of complexly-curved inner and outer surfaces; cooling the wheel-shaped articles; and removing excess metal from some areas of the wheel-shaped articles, an improvement which comprises: inspecting at least some of said wheel-shaped articles at a plurality of points along a transverse plane through said inner and outer surfaces and at a plurality of transverse plane locations about the perimeter of each article being inspected with a contactless gauging system recently after said articles have been hot-shaped to determine whether said articles are within dimensional requirements to form a wheel therefrom; and taking corrective action to the hot-shaping operation to minimize the number of unacceptable wheel-shaped articles that are formed.

2. An improvement as set forth in claim 1 wherein the hot-shaping operation includes forging wheel-shaped articles from metal blanks.

3. An improvement as set forth in claim 1 wherein the wheels are manufactured from a metal selected from the group consisting of aluminum and steel.

4. An improvement as set forth in claim 1 wherein excess metal is removed from the wheel-shaped articles by a machining operation.

5. In a production line method for forming wheels which includes hot forming blanks of metal into wheel-shaped articles having a plurality of complexly-curved inner and outer surfaces, cooling said articles, and machining excess metal from said articles after they are cooled, the improvement which comprises:
   (i) measuring at least some wheel-shaped articles promptly after they have been forged and before they are machined, said measuring using a plurality of lasers and cameras to determine the cross-sectional thickness of said articles at a plurality of points along a transverse plane through said inner and outer surfaces and at a plurality of transverse plane locations about the circumference of each measured article;
   (ii) comparing the cross-sectional thicknesses of each measured article against the thicknesses of a similarly-shaped article that is acceptable for machining into a wheel; and
   (iii) taking prompt correction action to the forging operation which a thickness of the measured article is outside of an acceptable range for machining.

6. In a production line method for forming wheels which includes hot forging blanks of metal into wheel-shaped articles having a plurality of complexly-curved inner and outer surfaces, cooling said articles, machining excess metal from said articles after they are cooled and taking prompt corrective action to the forming method when a wheel-shaped article is outside of an acceptable range for machining, the improvement which comprises:
   (i) measuring at least some wheel-shaped articles promptly after they have been forged and before they are machined, said measuring using a plurality of lasers and cameras to determine the cross-sectional thicknesses of said articles at a plurality of points along a transverse plane through their inner and outer surfaces;
   (i) indexing said articles for repeating measuring step (i) at a plurality of transverse plane locations about the circumference of each measured article; and
   (iii) comparing said cross-sectional thicknesses of each measured article against the thicknesses of a similarly-shaped article acceptable for machining into a wheel.

* * * * *